United States Patent
Bittner et al.

(10) Patent No.: US 8,767,805 B2
(45) Date of Patent: Jul. 1, 2014

(54) ASSEMBLY AND METHOD FOR THE PARALLEL PROCESSING OF DATA STREAMS BY MEANS OF SATELLITE COMMUNICATION LINKS

(75) Inventors: Steffen Bittner, Dresden (DE); Marco Krondorf, Dresden (DE)

(73) Assignee: INRADIOS integrated radio solutions GmbH, Dresden (DE)

( * ) Notice: Subject to any disclaimer, the term of this patent is extended or adjusted under 35 U.S.C. 154(b) by 30 days.

(21) Appl. No.: 13/698,409

(22) PCT Filed: May 17, 2011

(86) PCT No.: PCT/EP2011/057982
§ 371 (c)(1),
(2), (4) Date: Jan. 22, 2013

(87) PCT Pub. No.: WO2011/144620
PCT Pub. Date: Nov. 24, 2011

(65) Prior Publication Data
US 2013/0114648 A1    May 9, 2013

(30) Foreign Application Priority Data

May 17, 2010  (DE) .......... 10 2010 029 016
Apr. 1, 2011   (DE) .......... 10 2011 006 618

(51) Int. Cl.
    *H04B 1/38*    (2006.01)
(52) U.S. Cl.
    USPC .......... 375/219; 375/211; 455/13.4; 455/429
(58) Field of Classification Search
    CPC ............ H04B 1/40; H04L 1/20; H04M 11/06
    See application file for complete search history.

(56) References Cited

U.S. PATENT DOCUMENTS

| | | |
|---|---|---|
| 6,233,433 B1 | 5/2001 | Norin |
| 2002/0131528 A1 | 9/2002 | Clewer et al. |
| 2005/0032472 A1 | 2/2005 | Jiang et al. |
| 2011/0142105 A1* | 6/2011 | Zahm et al. .......... 375/219 |

FOREIGN PATENT DOCUMENTS

| | | |
|---|---|---|
| EP | 0 929 164 A1 | 7/1999 |
| WO | 2008/086414 A2 | 7/2008 |

OTHER PUBLICATIONS

International Search Report for International Application No. PCT/EP2011/057982, dated Sep. 14, 2011.

* cited by examiner

*Primary Examiner* — Leon-Viet Nguyen
(74) *Attorney, Agent, or Firm* — Heslin Rothenberg Farley & Mesiti P.C.

(57) ABSTRACT

The assembly includes a first sub-assembly with, on a transmitter side, a modem having a plurality of inputs, an output for a total data stream, and signal paths connected in parallel. Each signal path includes a modulation stage, a stage for sampling modulated signals and a mixer stage Outputs of mixer stages are connected to inputs of a summation stage, and output of the summation stage is connected to output of the modem. A second sub-assembly has an input for initialization data connected to an assembly for controlling a test operation. The sub-assembly is connected to a downstream carrier management assembly having a plurality of outputs. Each output is connected to a test sequence generating unit. Outputs of all test sequence generating units are connected to a parallel/serial converter assembly connected downstream of a filter assembly. Output of the filter assembly is connected to output of the second sub-assembly.

8 Claims, 7 Drawing Sheets

…

Figure 1:
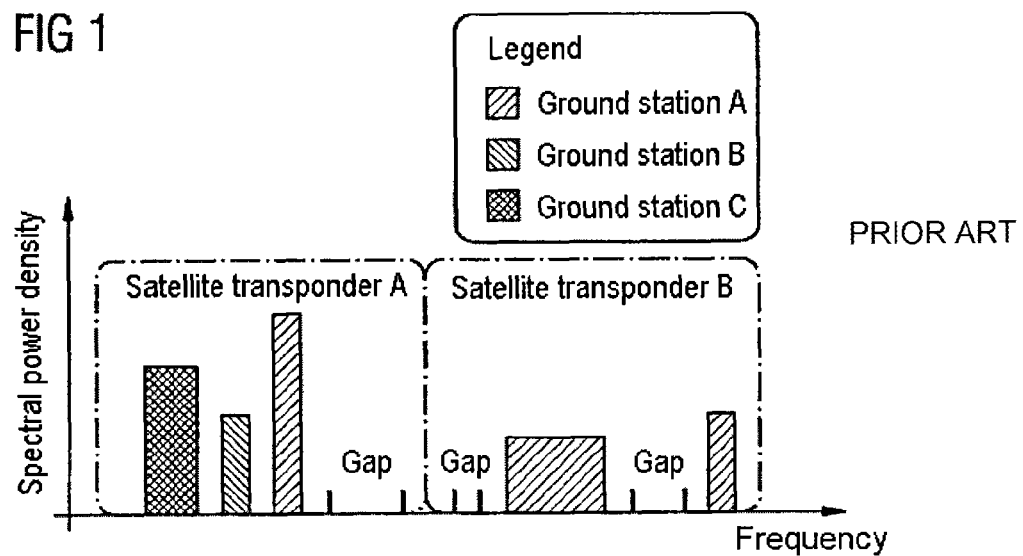

ASSEMBLY AND METHOD FOR THE PARALLEL PROCESSING OF DATA STREAMS BY MEANS OF SATELLITE COMMUNICATION LINKS

CROSS REFERENCE TO RELATED APPLICATIONS

This application is a national stage filing under section 371 of International Application No. PCT/EP2011/057982, filed on May 17, 2011, and published in German on Nov. 24, 2011, as WO2011/144620 A1 and claims priority of German applications No. DE 10 2010 029 0165.5 filed on May 17, 2010, and No. DE 10 2011 006 618.7, filed on Apr. 1, 2011, the entire disclosure of these applications being hereby incorporated herein by reference.

BACKGROUND ART

The invention relates to an assembly for the parallel processing of data streams by means of satellite communication links, which consists of a first subassembly for a data transmission operation and/or of a second subassembly for a test operation.

The invention also relates to a method for the parallel processing of data streams by means of satellite communication links, wherein the method is operated with a first operating mode for a data transmission operation in which useful data in the form of a data stream are transmitted via a number of carriers, and/or a second operating mode for a test operation in which test data are transmitted via a number of carriers.

When processing data streams by means of satellite communication, the following requirements essentially occur:
 Efficient performance of so-called In Orbit Tests (IOTs) with particular focus on measuring accuracy, measurement time and little influencing of existing communication links
 Increasing the data rate per communication link in the case of uniform occupancy of the frequency spectrum
 Increasing the data rate per transponder/channel/satellite (data throughput), improving the degree of utilization (so-called fill rate), i.e. as uniform and complete utilization as possible of available transponder bandwidth and transponder power
 Overcoming capacity limitation due to analog interferers and overcoming data rate restrictions due to regulatory limitations of the transmitting power (frequency and orbit coordinates)

In the text which follows, the individual requirements listed above will be discussed.

In Orbit Tests (IOTs):

So-called In Orbit Tests (IOTs) are performed at regular intervals for protecting warranty claims, for checking the contractually agreed performance parameters or for testing components in the space segment, but also for measuring the transmission quality. In this context, the satellite components to be surveyed are removed from useful operation, as a rule, and surveyed with the aid of special test signals and measuring methods from the ground. Apart from the costs for the measurements which, as a rule, is a service of third parties, this mainly results in losses of turnover since no fees can be charged for rented satellite capacity for the duration of the measurements.

At the same time, such IOTs have a high contractual relevance since the satellite manufacturer must always guarantee product quality over the entire product life cycle to his customer, typically the satellite service provider. The service provider then derives from this a certain availability of the satellite link and a quality of service which, in turn, it guarantees to the end user, as part of service level agreements (SLAs).

IOTs are thus necessary and unavoidable because they serve to establish the bearer of the economic load of unfulfilled SLAB. The quality of an IOT concept is therefore assessed primarily by means of the accuracy of measurement and the necessary measuring time within which no useful data can be transmitted. An ideal and superior concept allows the transmission of useful data for all relevant measurements even during the measuring. Furthermore, such a concept allows the user, i.e. the operator of the communication link to survey the required parameters independently and in the course of operation without collaboration by third parties so that he can verify directly the degree of fulfillment of the SLAB he was assured of.

Data Rate Per Communication Link:

The requirements for higher data rates per communication link are placed more and more into the center of future solutions. A higher data rate allows the transmission of more information within the same time frame and without increasing the exclusively needed frequency spectrum and is thus of great economic interest.

Increasing the Data Rate Per Satellite: (Data Throughput)

A spectrum fragmentation is understood to be a mostly irregular breaking of a frequency spectrum into information-carrying and unused frequency ranges. This spectrum fragmentation represents a great challenge to satellite and teleport operators because unused spectrum in conjunction with existing power reserves of the same transponder is equivalent to gain losses which must be minimized. In this respect, it must be noted in explanation that a satellite operator always attempts to release transponder power and transponder bandwidth in equal proportions of the resources available overall. This corresponds to a uniformly equivalent division of the available power to the transponder bandwidth and allows an again uniform utilization of the transponder in conjunction with further operational advantages, such as lower losses by mutual interference between the communication links. In addition, the method takes into account the fact that often several links of the same type, e.g. several television channels, are transmitted per transponder. In the text which follows, it is thus assumed that unused transponder bandwidth must be equated with an also freely available equivalent rating.

In most cases, transponder spectrum is leased together with the fitting equivalent rating from a teleport operator with a satellite operator in a greater extent and over a relatively long period of time. The teleport operator, in turn, distributes the spectrum in relatively small blocks of variable size which are then leased to the end user.

Due to, for example, differently long contract period, failure of a contractual partner, hiring of further capacities, spectra released in the course of the conversion from analog to digital data transmission (key word: digital dividend) and the like, a fragmented spectrum is rapidly produced. This becomes economically fatal if the sum of the free positions/gaps in the spectrum and the transmitting power of the satellite in principle still provide for communication services but this is not possible due to the fragmentation of the spectrum. In practice, fragmented free bandwidth occurs when several customers with single narrow-band links discontinue these at different times. Apart from the transponder bandwidth, the corresponding equivalent rating naturally also becomes available. A superior method is capable of economically utilizing this free bandwidth and power in parts or all together when the individual blocks for occupancy with new communication links are indeed too small but the sum of the available narrow blocks would still be adequate for the operation. Quotable sources here are the State of the Satellite Industry Report (Satellite Industry Association, June 2010), Satellite Communications & Broadcasting Markets Survey Forecasts to 2019 (Euro Consult 2010), Boeing Commercial Communications Satellites (GEO) Jun. 30, 2010 and How Many Satellites are Enough? A Forecast of Demand for Satellites, 2004-2012 (Futron).

Capacity Limitation By Analog Interferers:

Physical, that is to say technical and production-related interference mechanisms in the analog components lead to the transmitted and received signal, respectively, experiencing a multiplicity of the most varied types of signal distortions, caused, for example, by phase noise, DC component, frequency offset, nonlinearities, jitter and I-Q asymmetry. In principle, such disturbances always arise where analog modules are used. In the case considered here, therefore in the transmitting ground station, in the satellite transponder and in the receiving ground station.

Transmitting ground station: the digital/analog conversion is followed by analog processing stages such as, e.g., mixing with the carrier frequency and signal amplification. In this context, each stage leads unavoidably to a more or less strong linear and/or nonlinear signal distortion. Whilst linear distortions can be eliminated by known methods and thus play a subordinate role, there is still a great demand for avoiding/compensating for nonlinear distortions. The nonlinear distortion is particularly strong in the case of a simultaneous operation of several carriers because in this case, there is additive heterodyning of the signals before the actual disturbance.

Satellite transponder: there are many analog modules in the satellite transponder so that interactions between the individual carriers (adjacent channel interference—ACI) also occur here which magnifies the problem of nonlinear distortion even further.

Receiving ground station: in principle, signal distortions also arise in the receiver chain, i.e. before the signal digitization. In comparison with the other two sources (transmitting ground station and satellite), however, these distortions can be considered to be significantly smaller and can be neglected in most cases.

Considered in summary, the transmitting ground station and/or the satellite can be considered as main interference sources. The extent of contribution of the two positions is here dependent on the respective utilization of the ground station involved and of the satellite. If, e.g., only one signal is transmitted by a ground station involved, but the satellite transponder occupied is fully utilized, the distortion of the signal from the ground is very low but the induced distortion in the transponder is very high.

Quotable sources here are Abschlussbericht Studie Bundeswehr IT-Amt "Bandbreiteneffiziente Satellitenkommunikation" (Final Report Study IT Office German Federal Armed Forces "Bandwidth-efficient satellite communication") AUDENS Telecommunications Consulting GmbH, 2008, Final Report Study IT Office German Federal Armed Forces, reference number: E/IB2M/AA048/7F010 "Reduktion intermodulationsbedingter Kapazitätsverluste im Systemverbund SATCOMBw Stufe 2" (Reduction of intermodulation-related capacity losses in the combined system SATCOMBw stage 2) NRADIOS GmbH, 2010, "Satellite Communications Systems", Gerard Maral, Wiley & Sons, 2009, and "RF Power Amplifiers for Wireless Communications", Steve C. Cripps, Artech House, 2006.

A further problem is represented by the so-called ASI (adjacent satellite interference). ASI is the signal component received by a satellite B from a ground station although this station does not wish to uplink to this satellite B but to another satellite A, and also conversely (downlink). ASI is a result of inadequate antenna gains (beam focusing of the antennas) and, respectively, inadequate gain decoupling of the antennas from the point of view of the receiver (spatial separation of the signals). ASI leads to it not being possible to arbitrarily increase the transmitting power on the ground and at the satellite output without disturbing third-party satellites or third-party ground stations.

It is easily understandable that both signal distortions can be mapped directly onto the achievable data rate because the associated disturbances reduce the ratio of useful signal power and interference signal power at the respective receiver.

The sections following describe the current state of the art. At the moment, the current performance of IOTs is a very long-winded and time-consuming process. This is mainly due to the fact that the test equipment currently available on the market is not capable of performing effective wide-band tests. Although there would be the possibility of generating wide-band test signals for shortening the measuring time. This, however, conflicts with the measurements having to be performed with high accuracy, that is to say with a high C/N (Carrier to Noise) or SNR (signal-to-noise-ratio). To generate a signal with very wide bandwidth with high C/N, high powers would have to be radiated on the ground over a wide band. But in this respect, limits are prescribed by the regulating authority (e.g. frequency mask). In addition, the desired aim of such measurements at the same time with the useful data traffic in the transponder could obviously not be achieved by this means.

Currently there are two approaches for countering this problem:

High-power, narrow-band carriers
Low-power, wide-band carriers

Narrow-Band Carriers:

In the first, currently typical case, a narrow-band test signal is generated which is then progressively shifted from one test frequency to the next similar to a spectrum analyzer. Naturally, this produces a long test phase which is equivalent to a downtime of the satellite and thus entails the corresponding economic consequences. Apart from the obvious economic disadvantages, contradictory or poorly comparable measurement results can also be increasingly expected with this approach which arise plainly from the change in timing of the transmission channel during the measurements (e.g. weather influences). These results are not wrong but distort the view and do not reproduce the momentary characteristics of the overall system. In addition, enormous efforts are generally made to survey the changes in the transmission channel at the same time with the IOTs and calibrate the IOT measurement results subsequently.

For this purpose, separate technical devices must be kept available which are associated with considerable investment costs. This is extremely uneconomical for the predominant number of operators of teleports and of communication links which is why IOTs are offered today only by a few service providers with great market power.

Wide-Band Carriers:

Apart from the progressive shifting of a test signal, there is also a so-called spread-spectrum approach which spreads a sinusoidal carrier widely with the aid of a sequence and thus pushes it below the (thermal) noise level. In this way, the test signal is nearly invisible in the carrier for existing communication links so that these can also continue to be operated during the measurements. On the ground, a very good C/N is achieved again after the despreading. The advantage of this method is that the transmission of useful data can be continued during the measurement, but this method, too, is not of advantage with respect to the measuring time. It is, therefore, used predominantly for monitoring purposes. In addition, separate technical devices must be kept available also for this measuring method which, today, are also associated with very high investment costs. Feeding the test signal into the existing transmitting and receiving paths of the useful signals is often particularly expensive in this context because, apart from the technical expenditure, additional problems of calibration are added. In order to separate the actual effects of the satellite from possible influences of these ground-based signal paths, further measurements must be performed at the ground stations which will also lead to constructional and technical changes. For many operators, this, too, is uneconomical which is why they prefer the service again.

Since the permissible radiated power is limited by regulation, an approach for increasing the data rate of a communication link according to the prior art, which is well suited to satellite communication, is the parallel operation of a plurality of frequency bands/channels at the same time.

The current ground-based communication technology does not allow any inherent parallel processing of several channels. If it is desired to manage this with the current modem technology, the simultaneous operation of several individual modems is necessary. This means that at the transmitter side, a data stream to be transmitted must be divided into several modems, processed separately and, after analog/digital conversion, combined again synchronously at the output of each modem. At the receiver side, an equivalent inverse operation must be carried out.

Current systems already use a similar simplified method. The user information to be transmitted is divided already at a higher protocol layer (IP level) with the aid of a router or multiplexer into several subchannels and then supplied to various standard single-channel modems. Particularly advanced systems integrate these signal-channel modems in the same housing so that the impression of "one modem" is produced for the customer although the signal streams are not connected to one another. This variant, therefore, does not represent any technological development but can be called a slightly changed marketing strategy. The completely independent signal streams of the various modems are transmitted later via a common high-frequency path and the same antennas to one, several or also different receivers where the inverse operations then take place.

Here, too, it can be easily appreciated that the method described has several disadvantages at once:

Increased total weight of the ground stations (each individual modem contributes to this), problematic especially in mobile or transportable use Increased power consumption in operation (each modem consumes current and must be cooled additionally), problematic especially in mobile or transportable use The ground station must always be designed for the worst case, i.e. for the data streams to be transmitted simultaneously at a maximum in the boundary case. This is not the most economic solution since the contribution of the modems to the total price increases linearly with a number of data streams.

Synchronization problems (the functionality of the modems must be matched to one another, high technological expenditure; such a solution on the physical layer, i.e. before/after the DA/AD conversion, has not been known hitherto which is why the distribution of the information at a higher protocol layer (IP level) is being resorted to today)

Increased susceptibility to interference (a discrete implementation is more susceptible to mechanical influences due to its structure)

With respect to an increase in the data rate per satellite, also called data throughput increase, the following must be taken into consideration. The spectrum fragmentation is inversely proportional to the so-called fill rate which is also called load rate per satellite or utilization rate.

The fill rate quantifies the utilization of a satellite with regard to frequency spectrum and transmitting power and can be 100% at maximum.

If the fragmentation of the spectrum is too great or if the fill rate exceeds a predetermined barrier so that no further services can be supported even though sufficient frequency spectrum and transmitting power is still available overall, replanning of the channel/transponder occupation or also of the satellite occupation takes place. This planning is in most cases performed by a very experienced person and with software support. To aggravate matters, preexisting communication links should not be changed, if possible, since in most cases a fixed frequency and bandwidth has been leased to the end user and/or many satellite terminals, especially in crisis regions or regions with poorly developed infrastructure, operate unmanned today.

If the technical changes discussed have to be performed and this cannot be done remotely, this often involves high costs for the operator of the communication links since, in most cases, he is not on site with his own personnel and thus has to commission subcontractors.

To this is added that the approach of replanning is extremely inflexible because it is only when it is really necessary that such a large incision is made in all existing communication links. However, this also means that ad-hoc or short-term enquiries for more spectrum are associated with high financial expenditure. The operator of the system will often even reject short-term enquiries for new spectrum since the achievable additional income will not cover the costs for replanning all existing connections, also called line-up.

Analog interferers will result in a limitation of capacity in the processing of data streams.

Prior investigations have shown that the spectral efficiency of the satellite link can be increased considerably especially by bandwidth-efficient transmission methods. At the same time, it was found that, caused by nonlinear components, the maximum data rate of various links is limited significantly by intermodulation-related degradations of the signal quality. Higher data rates can thus be implemented only by accepting a reduced power efficiency of the ground station and/or of the space segment. Furthermore, elaborate methods for optimizing the carrier occupancy under intermodulation disturbances must be used, the degrees of freedom in the occupancy and combinations of narrow or weak carriers per transponder being distinctly restricted. In systems having a highly heterogeneous architecture for the types of ground station to be operated at the same time (small and large stations, high-power and low-power stations, stations for single links and multichannel stations etc.), these degrees of freedom are of decisive significance.

The problems of ACI are currently counted in such a manner that the space between the transmitting frequencies per channel is correspondingly increased and, if necessary, the transmitting power is reduced. The latter leads to the analog modules then operating in a linear range. The problem of ASI is significantly influenced by the antenna gain. In this case, geographic or frequency-related decoupling of the coverage areas and limitations of the permitted transmitting power are used. However, both of these lead directly to the bandwidth efficiency/SNR being significantly reduced and thus also the achievable data rate.

BRIEF SUMMARY OF INVENTION

The invention is based on the object of specifying a method and an assembly for the parallel processing of data streams by means of a satellite communication link, in which the achievable data rate/data throughput of the communication link is improved and the expenditure and the time necessary for a test of the satellite communication link is reduced.

According to the invention, the object is achieved by means of an assembly of the type initially mentioned in that the first subassembly consists of a modem having a number of inputs on the transmitter side, wherein a data stream can be applied to each input, and of an output for a total data stream, wherein the modem has a number of signal paths connected in parallel, wherein in each signal path, a modulation stage, a stage for sampling the modulated signal and a mixing stage is arranged, in that the outputs of all mixing stages are connected to inputs of a summation stage and in that the output of the summation stage is connected to the output of the modem, in that the second subassembly has an input for actuating the subassembly by means of initialization data, which is connected to a control management and multiplexing unit for controlling the test operation, in that this unit is connected to a downstream carrier management assembly which has a number of outputs, in that each output is connected to a test sequence generating unit for generating one test sequence per carrier, in that the outputs of all test sequence generating units are connected to a parallel/serial converter assembly which is followed by a filter assembly and in that the output of the filter assembly is connected to the output of the second subassembly.

On the transmitter side, the first subassembly consists of a modem having a number of parallel signal paths. To the input of each signal path, one data stream is applied in each case which is intended to transmit a satellite communication link. Each of these n data streams is supplied to a modulation and to a signal sampler and subsequently mixed onto a predetermined carrier frequency in a mixing stage. All data streams processed in this manner are subsequently combined in a summation assembly and in this manner a total data stream is formed.

The second subassembly which has an input for control or initialization data can be actuated by a computer for initializing a test operation. The control signal applied at the input and corresponding initialization data are transferred to a control management and multiplexing unit for controlling the test operation. By means of this unit and a carrier management unit for actuating a number of test sequence generating units, a number of parallel-connected test sequence generating units are actuated which generate a test sequence for one carrier each. These test sequences are supplied to a parallel/serial conversion and filtered. The total test signal generated in this manner is converted into a total analog test signal by means of an analog/digital conversion before it is amplified via a high-power amplifier and radiated by means of an antenna. Via the satellite communication link, the total test signal reaches a receiver in which various parameters of the satellite communication link are then evaluated. Due to the parallel test sequence generation, the time required for a test of all available channels is drastically reduced. In addition, the operation can be continued immediately with the transmission of useful data after the transmission of the test sequences to a receiving station whilst in the receiving station, the transmission parameters are evaluated "off-line" in parallel with the transmission of useful data.

In one embodiment of the invention, it is provided that the first subassembly is followed by an assembly for reducing nonlinear distortions.

According to the invention, the modem is equipped optionally with an assembly for reducing nonlinear distortions. By means of this assembly, nonlinear distortions of the total test signal are minimized.

In one embodiment of the invention, it is provided that the first subassembly is preceded by a data adapting/dividing stage which has an input for an input data stream and a number of outputs for output data streams and implements a division of the input data stream into a number of output data streams, the outputs being connected into the inputs of the modulators of the modem.

An increase in the achievable data rate per satellite is achieved according to the invention in that a high-rate data stream, that is to say a data stream having a high data transmission rate, is divided over several part-data streams to be transmitted via the satellite communication links by means of a data adapting/dividing stage. This dividing can be done in equal or different proportions with respect to the part-data streams. By means of this division, several transmission channels of the satellite communication link are utilized simultaneously and thus a better utilization is achieved over all channels and an increase in the achievable data rate per satellite.

In a special embodiment of the invention it is provided that the assembly for reducing nonlinear distortions is followed by a stage for digital/analog conversion.

By means of this assembly, the total test signal generated in this manner is digital/analog converted before the signal amplification and radiation.

According to the invention, the object is achieved with respect to the method in such a manner that in the first operating mode, parallel processing of a number of data streams to be transmitted is carried out, each data stream being modulated and mixed onto a predetermined frequency and subsequently all modulated and mixed data streams being combined to form a total data stream and being transmitted via the satellite communication links, that in the second operating mode, on the transmitter side, test data are generated for each carrier, modulated and transmitted as a common transmitting signal via the satellite communication link and that on the receiver side, an associated receiver signal is received and subsequently evaluated.

In the first operating mode for the data transmission operation, parallel processing of a number of data streams is carried out at the same time in only one assembly. The processing comprises modulation, mixing and summation of the data streams to form a total data stream and digital/analog conversion of the total data stream before power amplification and radiation of the signal by means of an antenna via a satellite communication link.

In the first operating mode for test operation, generation of test data or test sequences is carried out for each individual carrier separately and at the same time. Thus, the current operation in which useful data are normally transmitted via the satellite communication link needs to be interrupted only briefly for carrying out a test operation for a number of or all available channels and can be continued after the transmission of the test sequences and the reception and temporary storage of the received sequences in a receiving station. The test can subsequently be evaluated.

In one embodiment of the method, it is provided that in the first operating mode, after the generation of the total data stream, a reduction of nonlinear distortions is effected before the total data stream thus changed is transmitted via the satellite communication links.

In the first operating mode, it is provided to carry out a reduction of nonlinear distortions of the total signal. The prerequisite for this is the parallel processing of the data streams both on the receiver and on the transmitter side and knowledge of the statistical characteristics of the interference processes such as nonlinearities and phase noise and of the signal afflicted by the interferer. On this basis, an estimation of an implementation of the interference process (trajectory) and the corresponding removal from the received signal is effected.

In a further embodiment of the invention, it is provided that in the first operating mode, before the parallel processing of several data streams to be transmitted, an input data stream is divided over several data streams to be transmitted.

To increase the transmission data rate via a satellite, it is provided to divide high-rate data streams into a number of low-rate data streams and then to transmit them via the satellite communication links. In this context, the low-rate data streams can be different with respect to their data rate, coding and modulation.

In one embodiment of the invention, it is provided that in the second operating mode, after the reception of an associated receiver signal, the evaluation is effected off-line.

So that the current operation, that is to say the transmission of useful data via the satellite communication links, only needs to be interrupted for a short time for performing a test operation, it is provided to perform an evaluation of the received sequences of the test operation in parallel with the operation then already active again. For this purpose, it is provided to temporarily store the received sequences and then to read them out and evaluate them after active operation has been started.

BRIEF DESCRIPTION OF THE DRAWING FIGURES

Figure 2:
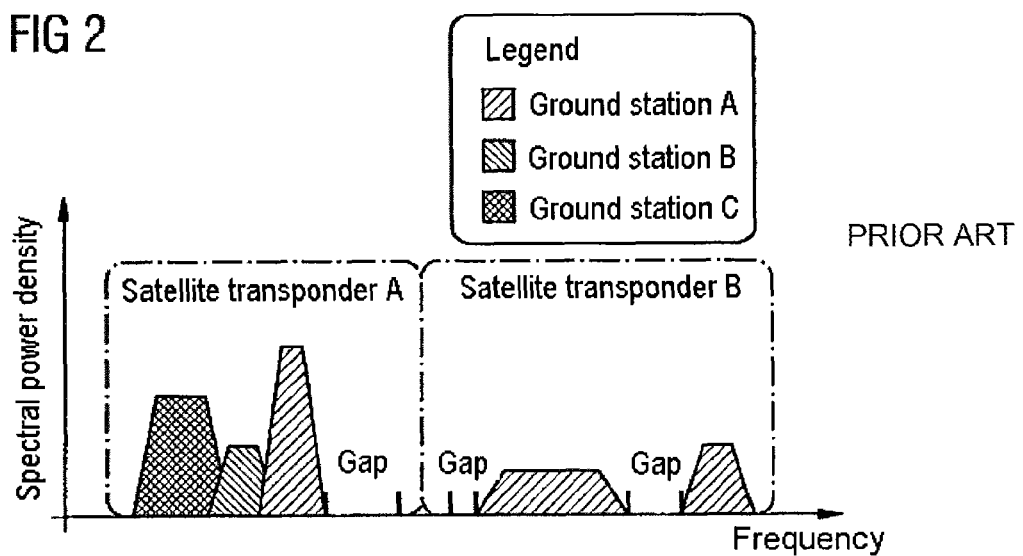
Figure 3:
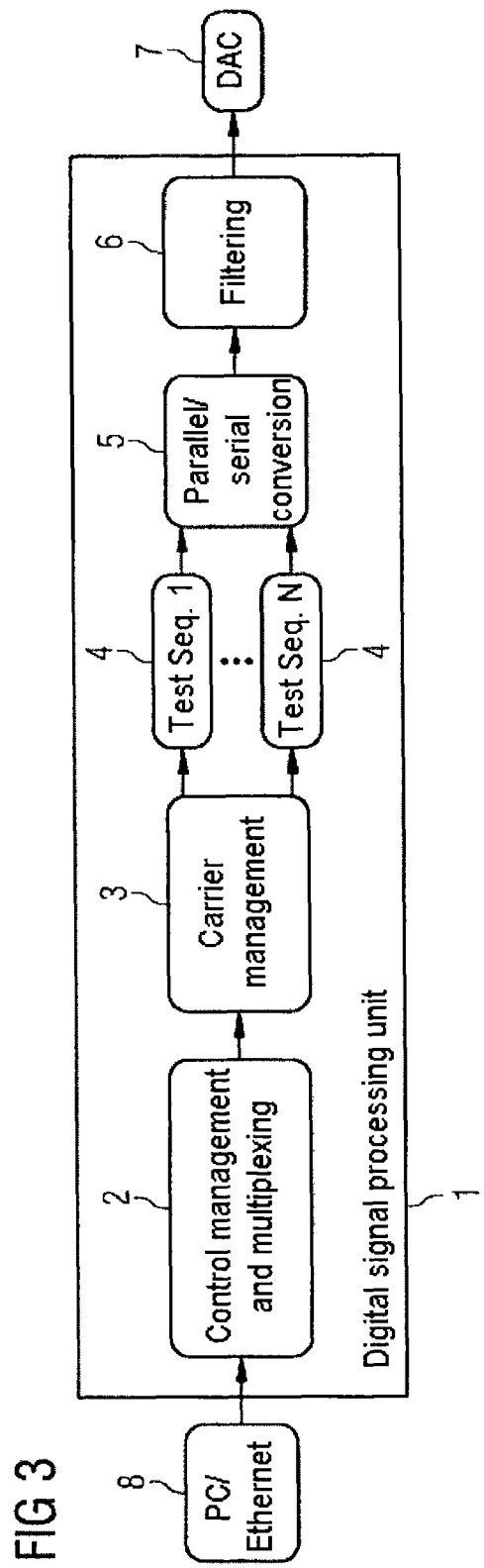
Figure 4:
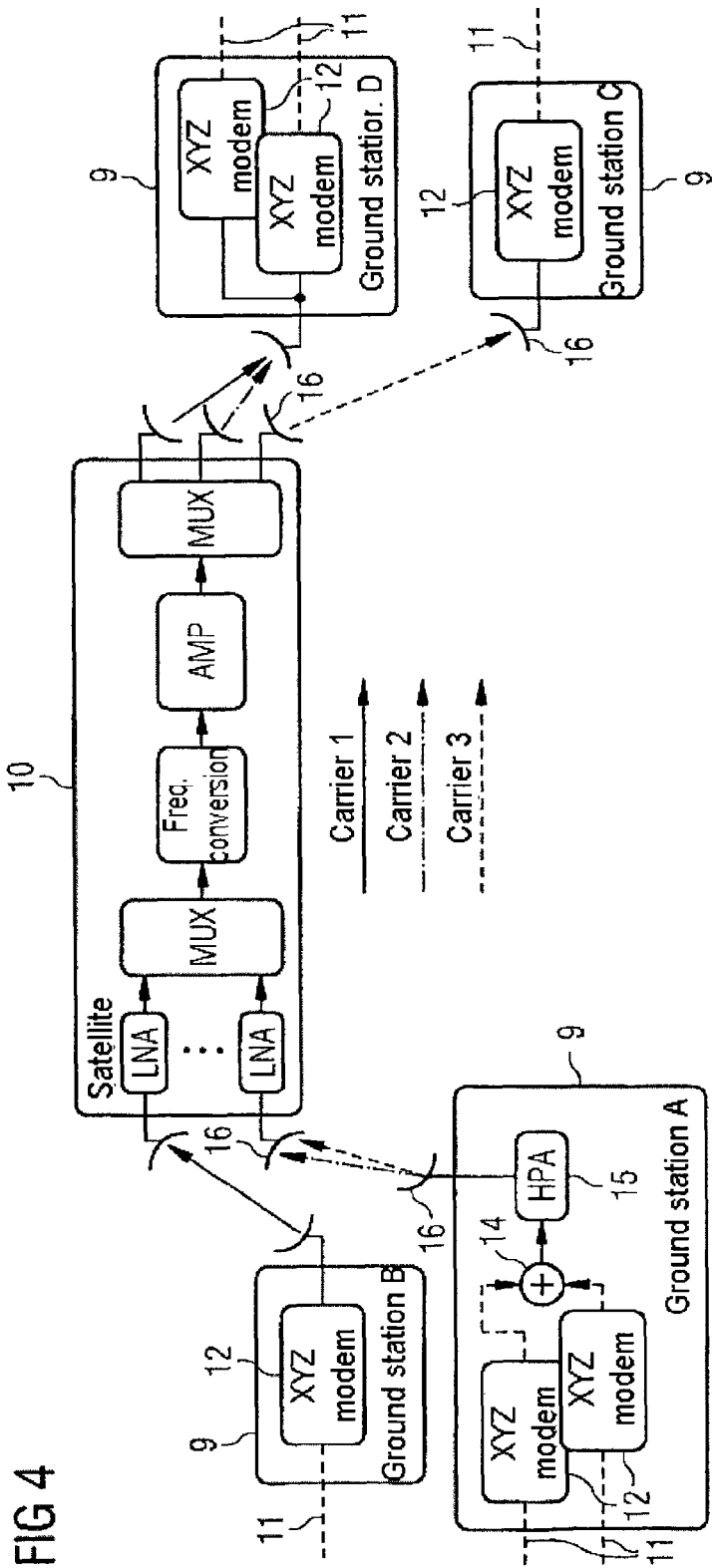
Figure 5:
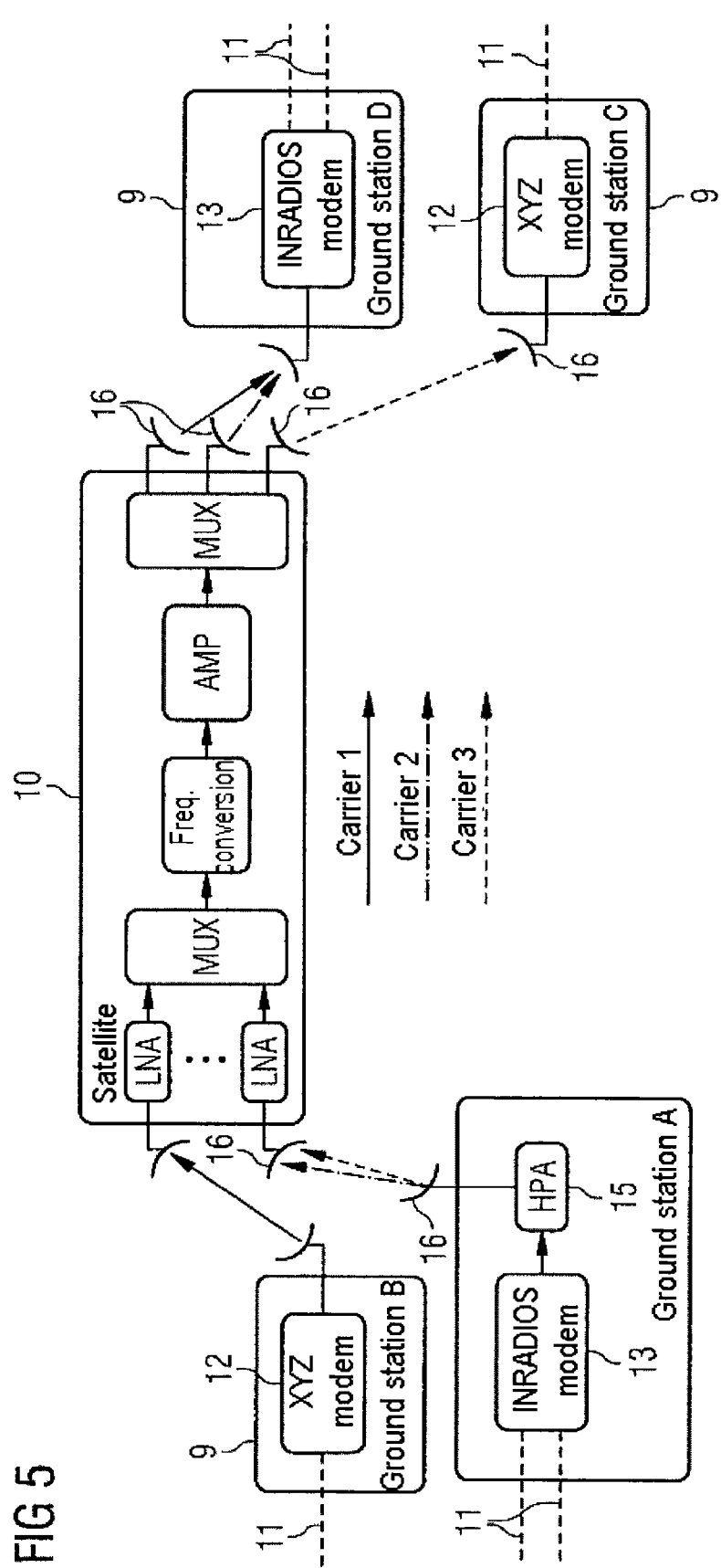
Figure 6:
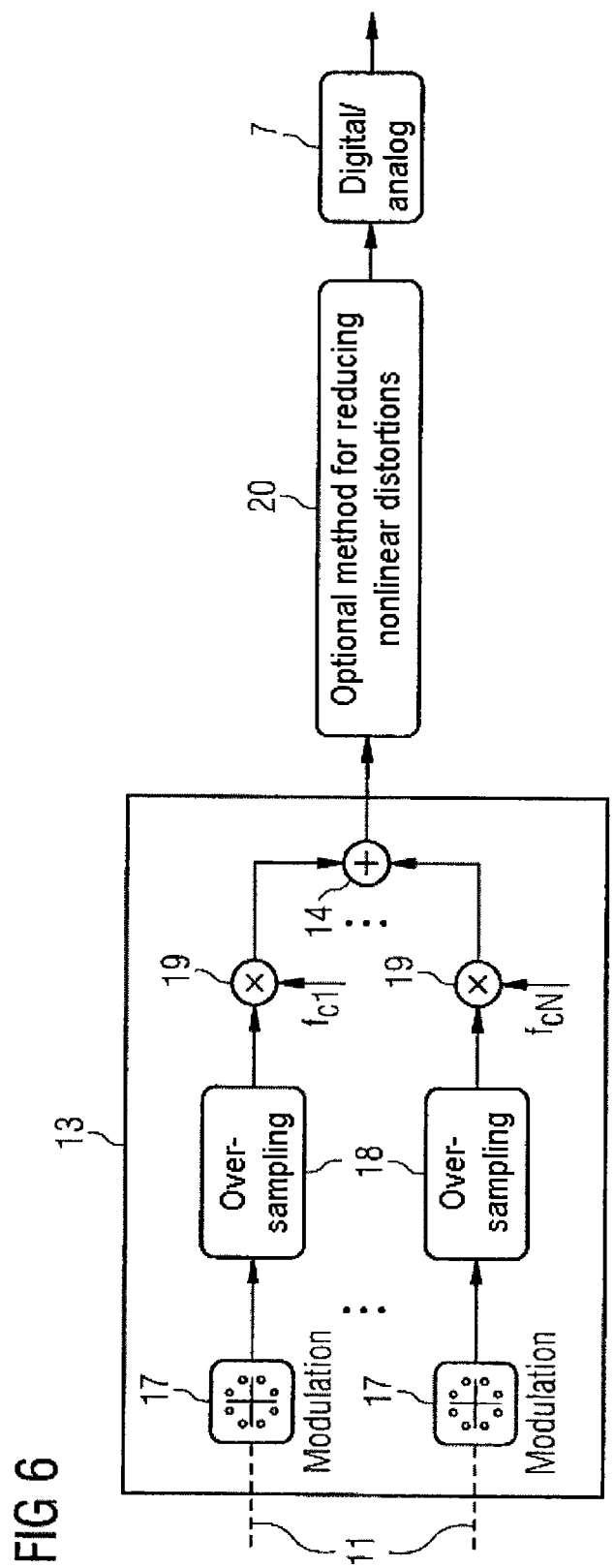
Figure 7:
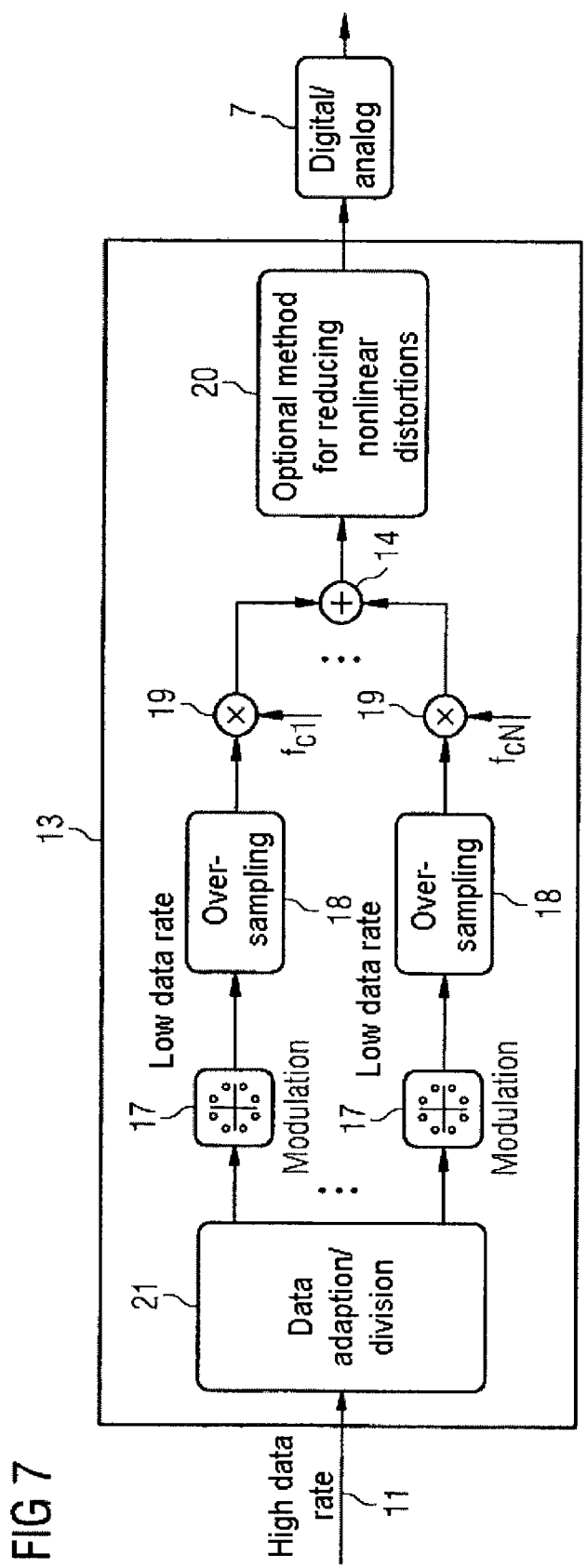
Figure 8:
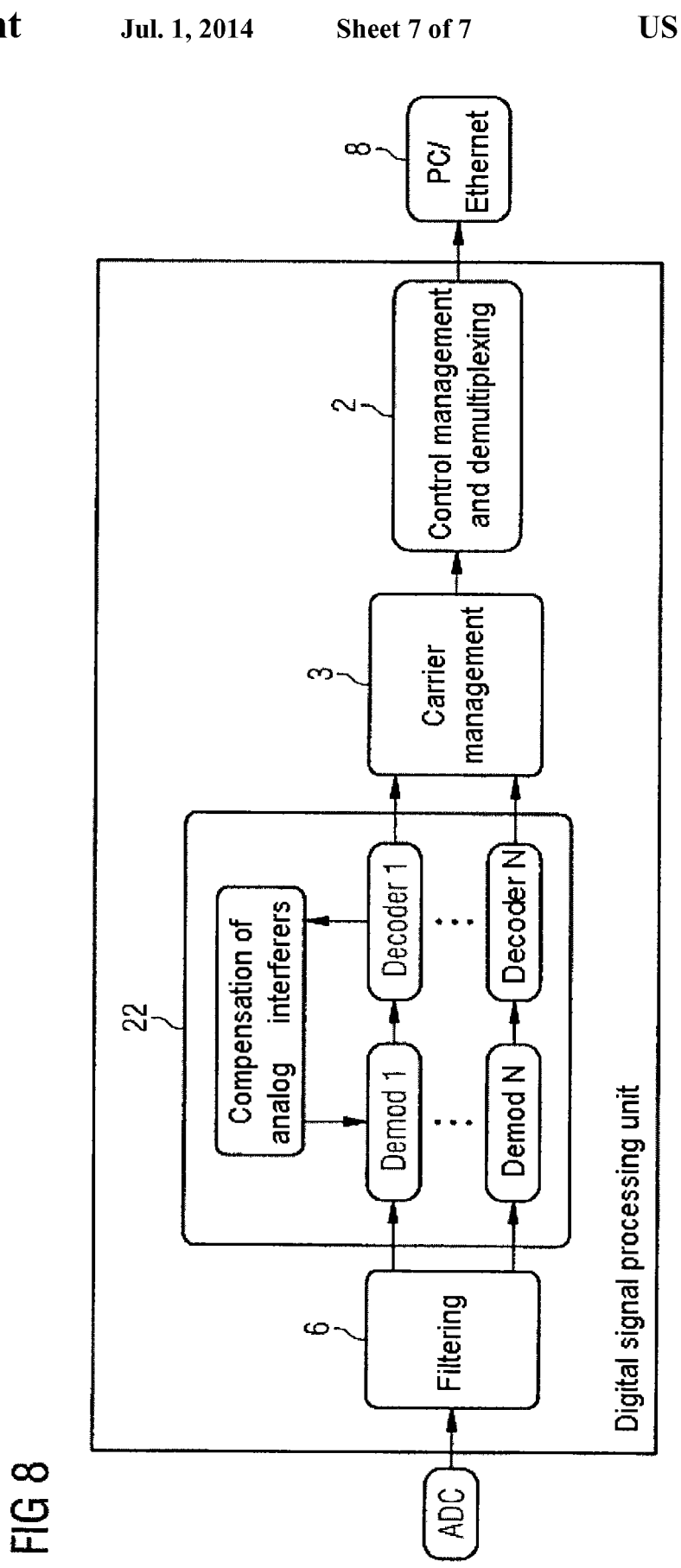

The solution shall be explained in greater detail with reference to an exemplary embodiment in the text which follows. In the associated drawings, FIG. 1 shows a representation of a power density/frequency diagram comprising a number of ground stations and satellite transponders according to the prior art, FIG. 2 shows an influence of nonlinear distortions on the diagram from FIG. 1, FIG. 3 shows a proposed assembly for an IOT measurement, FIG. 4 shows a basic representation of an assembly for satellite communication according to the prior art, FIG. 5 shows a basic representation of an assembly according to the invention for satellite communication comprising an INRADIOS modem, FIG. 6 shows a basic representation of the internal circuitry of the INRADIOS modem, FIG. 7 shows a further embodiment of the modem from FIG. 6, and FIG. 8 shows a basic representation of an assembly on the receiver side for compensating for nonlinear distortions by parallel processing of radio signals.

DETAILED DESCRIPTION

The core approach to a solution for all the problems mentioned is the simultaneous parallel (also cross-transponder) processing of a number of channels/frequency bands on the physical layer in a modem. To this end, FIG. 1 shows a spectral power density within a satellite transponder or beyond transponder boundaries.

Two satellite transponders A and B and signals from three different ground stations (A, B, C) can be seen, three frequency bands being radiated by ground station A whereas in each case only one band is transmitted by stations B and C. Furthermore, gaps are drawn which are intended to illustrate the fragmentation of the spectrum. In the current state of the art, each frequency band is modulated separately by a modem on the transmitter side and demodulated again by a modem on the receiver side.

If then a nonlinear distortion of the signals occurs, either during the signal processing on the ground or in the satellite, a reduction of the amplitude arises in the frequency domain and a widening of the spectra which leads to the said interactions (spectral superpositions) between the carriers. This effect is shown diagrammatically in FIG. 2.

If there are interferences and/or nonlinear distortions in the system, individual processing of the carriers by individual modems does not lead to an increase in the data rate since, according to the rule of total probability, only a complete knowledge of the entire mixture of signals of all frequency bands involved in the interference maximizes the a posteriori probability of the signal transmitted and thus lastly allows a higher (maximum) data rate. An exchange of information between the modems about the signal characteristics of the individual modems is not provided.

To produce an efficient and economical IOT, two possible implementations of an improved digital signal processing unit at the ground station are proposed at this point:

The ground station has the technological capability of generating suitable sequences (e.g. training/correlation sequences or similar) and can then modulate these onto a wide-band signal. In this context, it must be considered whether such a training sequence is also able to evaluate with sufficient C/N, using the permissible radiated power density as a basis. However, the maximum radiated power density permissible via the regulating authority is different for different frequency bands.

The ground station tracks the approach of simultaneous processing of several carriers. The concept consists in modulating several training sequences for the IOT onto several carriers and subsequently processing them jointly. In the boundary case, this would then be a type of simultaneous spectrum analyzer over all frequencies so that the frequency bands to be surveyed then need to be occupied only once (briefly) and the result is subsequently calculated on the ground (off-line).

Especially the last aspect is to be described further here because it allows singular, fast parallel measurement and simultaneous processing of a number of frequencies/carriers. This is an essential inventive concept which is contained not only in the parallelity of the processing section but also in its adaptivity and agility (bandwidth used, carrier frequencies, correlation sequences etc.). In this respect, FIG. 3 shows a general diagrammatic design of a transmitting unit according to the invention.

Via a corresponding interface, not shown in FIG. 3, initialization data are transferred to the digital signal processing unit 1. In the example, these initialization data are provided by means of a PC/Ethernet technology 8.

These initialization data are processed by a control management and multiplexing unit 2 which actuates a downstream carrier management unit 3. This carrier management unit 3 controls the parallel, individual generation of the test sequences in the test sequence generating units 4 for the different carriers. The individual carriers are parallel/serial converted in the downstream unit for parallel/serial conversion 5 and filtered in a filter 6. The last stage of the digital signal processing 1 is connected to a unit for digital/analog conversion 7.

On the receiver side, equivalent parallel/wide-band signal processing takes place, the result of which provides information about the variables to be tested. If necessary, a current list of parameters can be generated for this purpose.

The simultaneous measuring of several satellites is a development of this technology. Current research projects which are still in the starting phase deal with the problem of effectively examining multi-antenna operation (MIMO) with distributed satellites and/or distributed ground stations. It is especially in the case of MIMO operation that precise channel knowledge is of decisive significance. However, scanning all frequencies and for all possible satellite-to-ground combinations would take much too long so that parallel processing is absolutely necessary here. The processing would then relate to the principles of time-, code- and frequency-division multiplex.

In increasing the data rate per communication link, too, the central principle is the parallel processing of a number of channels/frequency bands.

To illustrate the concept, FIG. 4 shows the current transmission situation by means of an incomplete schematic diagram. The terms HPA, LNA, MUX and AMP come from the English language and mean HPA (high power amplifier),
LNA (low noise amplifier),
MUX (multiplexer/demultiplexer) and
AMP (amplifier, special power amplifier).

FIG. 4 shows a number of ground stations 9 and a satellite 10 with their essential functional assemblies. A single or a plurality of data streams 11 on the input side are processed in ground stations 9 (arranged on the left-hand side of FIG. 4) and then sent to the satellite 10. The latter converts the carriers and then sends them back to ground, possibly also from different antennas, to the ground stations 9 arranged on the right-hand side of FIG. 4, or also conversely.

According to the prior art, one modem in each case 12 is arranged for each data stream 11 to be processed in a ground station 9 for this purpose. These modems 12 are connected with their outputs to a summation assembly 14 for generating an aggregate transmitting signal. The output of the summation assembly 14 is connected to a downstream high-power amplifier 15 which generates the transmitting signal radiated via the downstream antenna 16.

According to the invention, the individual modems 12 in the ground stations 9 are replaced by an INRADIOS modem 13, resulting in a representation according to FIG. 5. As shown in FIG. 5, the INRADIOS modem 13 according to the invention can process several data streams 11 and has an output for an aggregate transmitting signal. Apart from this modem 13, the modems 12 known from the prior art can also participate in the communication via the satellite 10 as shown.

This results in a miniaturization and integration of otherwise a multiplicity of modems into a product solution.
Advantages:
Individual and simple tunable bandwidth occupancy, modulation methods etc.
Agile and adaptive carrier occupancy
Reduction of the geometric dimension and associated advantages in price, weight, power consumption etc.

There could possibly also be a gain with respect to the bit error rate. The background to that is that, especially in a mobile application, frequency-selective fading may occur. Dividing the frequency band into several parallel subcarriers leads to diversity gains and lastly again to multi-carrier operation with all the advantages which are also already known in mobile radio.

Processing within a modem 13 is then carried out in accordance with the arrangement shown in FIG. 6. This only shows the modem section on the transmitting side as an excerpt.

The individual data streams 11 are modulated in one modulator 17 each within the modem 13 and, after oversampling 18 mixed up to their predetermined frequency in a mixing stage 19 and subsequently combined in a summation assembly 14.

Following this, a signal manipulation is optionally carried out in an assembly for reducing nonlinear distortions 20 in order to counteract nonlinear distortions. Relevant explanations will be given further below.

The spectrum fragmentation and replanning of a satellite are a continuous balancing act between technical/financial expenditure for performing the replanning and the gain expectation due to additional resources released. The approach following eliminates the problem of spectrum fragmentation according to the invention by intelligent, needs-based dividing of a high-rate data stream 11 into a multiplicity of parallel low-rate streams within a modem 13.

As shown in FIG. 7, a data rate adaptation and division of the high-rate data stream into several parallel data streams of low-rate data streams is carried out for this purpose in a data adapting/dividing stage 21.

The data rates of the individual parallel data streams can then have different wave shapes (coding and modulation) which are predetermined by the user. Software-supported planning and dividing of the data stream by the modem itself is also conceivable.

The advantages of parallel processing are listed in the following text:
The fragmentation of the spectrum is significantly reduced.
The utilization/fill rate of the satellite can be significantly increased and the total efficiency improves.
The frequencies can be occupied for short periods and adaptively.
Preexisting carriers do not need to be changed in their frequency and power slot, or only scarcely so.
The method can be expanded additionally with methods for reducing nonlinear distortions.
Remote capability of the modem allows remote control and remote monitoring of the system.
The free gaps in the spectrum can be detected, for example, by a corresponding analysis of the spectrum (power sensing, cognitive radio), which are then occupied with certain wave shapes depending on available power in the ground station and in the satellite. In this manner, a wide or high-rate data stream can be divided into many subcarriers.

Analog interfering influences must be avoided or suppressed by an adapted system design and/or correspondingly good analog components. However, this procedure is associated with a possible loss of spectral efficiency and higher costs. Whereas an exchange of hardware is always possible in principle at ground stations, this is obviously impossible with an operational satellite. To simultaneously preserve the capability of profiteering from technological advances also in the perennial operating phase of a satellite, a satellite should not be designed too individually but be based on a technical design which is as simple as possible and universal so that a maximum level of future-proofing is guaranteed.

This is primarily taken into account by approaches which move complex algorithms and special system designs to the ground side whereas the satellite contains tried and comparatively simple "transparent" technologies. An alternative approach derived under this premise for controlling known interfering influences is, therefore, to allow the analog interferers in the system which can be the transmitting ground station, the satellite or the receiver ground station, up to a certain degree and thus provide for more cost-effective components and system designs.

According to the invention, the resultant signal distortions are then compensated for digitally with the aid of suitable algorithms in the receiver ground station so that only the exchange of the receiving modem in the ground station is required.

The basic prerequisite is again the parallel processing of radio signals at the transmitter and/or at the receiver. The approach of increasing the capacity consists in estimating from the knowledge of the statistical characteristics of the interference process, for example of nonlinearities, frequency offset, in-phase/quadrature-phase offset, phase noise etc. and the signal afflicted with the interferer, which can be the signal from one's own and/or from a foreign satellite, an implementation, a so-called trajectory of the interference process which is then removed from the received signal. Depending on the type of disturbance, from simple additive superposition up to complicated interleaving of the most varied signal components, the in each case inverse operation must then be performed at the receiver. FIG. 8 shows a schematic diagram in this respect.

After the decoding, the interference is then estimated here which is then supplied to the demodulators as additional information. FIG. 8 thus shows the principle of a feedback loop which ends in an iterative procedure. In this context, the estimation of the trajectory is varied and depends significantly on the system requirements and the computing power of the destination platform. The iterative method represented here by way of example is a suboptimal method in the sense of estimation theory, but has the advantage of medium computing complexity.

FIG. 8 shows a module arranged on the receiver side for digital signal processing 1, this module being preceded by an analog/digital converter on the input side. After filtering of the input signal in the filter 6, the interference compensation according to the invention, described above, based on the knowledge of the statistical characteristics of the interference process, is carried out by parallel processing of the radio signals in the compensation stage 22. This is followed by a carrier management unit 3. The connection on the output side of the assembly for digital signal processing 1 to a, for example, downstream PC 8, is effected via the control management and multiplexing unit 2 and a corresponding interface.

The invention claimed is:

1. An assembly for parallel processing of data streams by satellite communication links, comprising a first subassembly for a data transmission operation and/or a second subassembly for a test operation, the first subassembly including a modem having a number of inputs in a transmitter side, wherein a data stream can be applied to each input, and an output for a total data stream, wherein the modem has a number of signal paths connected in parallel, wherein in each signal path, a modulation stage, a stage for sampling modulated signal and a mixing stage is arranged, outputs of all mixing stages are connected to inputs of a summation stage and an output of the summation stage is connected to the output of the modem, the second subassembly having an input for actuating the second subassembly by initialization data, which is connected to a control management and multiplexing unit for controlling the test operation, the unit is connected to a downstream carrier management assembly which has a number of outputs, each output is connected to a test sequence generating unit for generating one test sequence per carrier, outputs of all test sequence generating units are connected to a parallel/serial converter assembly followed by a filter assembly, and an output of the filter assembly is connected to an output of the second subassembly.

2. The assembly as claimed in claim 1, wherein the first subassembly is followed by an assembly for reducing nonlinear distortions.

3. The assembly as claimed in claim 1, wherein the first subassembly is preceded by a data adapting/dividing stage which has an input for an input data stream and a number of outputs for output data streams and implements a division of the input data stream into a number of output data streams, the outputs being connected to the inputs of modulation stages of the modem.

4. The assembly as claimed in claim 2, wherein the assembly for reducing nonlinear distortions is followed by a stage for digital/analog conversion.

5. A method for the parallel processing of data streams by satellite communication links, wherein the method is operated with a first operating mode for a data transmission operation in which useful data in the form of a data stream are transmitted via a number of carriers, and/or a second operating mode for a test operation in which test data are transmitted via a number of carriers, wherein, in the first operating mode, parallel processing of a number of data streams to be transmitted is carried out, each data stream is modulated and mixed onto a predetermined frequency and subsequently all modulated and mixed data streams are combined to form a total data stream and are transmitted via the satellite communication links, wherein, in the second operating mode, on a transmitter side, test data are generated for each carrier, modulated and transmitted as a common transmitting signal via a satellite communication link and, on a receiver side, an associated receiver signal is received and subsequently evaluated.

6. The method as claimed in claim 5, wherein, in the first operating mode, after formation of the total data stream, a reduction of nonlinear distortions is effected before the total data stream thus changed is transmitted via the satellite communication links.

7. The method as claimed in claim 5, wherein, in the first operating mode, before the parallel processing of several data streams to be transmitted, an input data stream is divided over several data streams to be transmitted.

8. The method as claimed in claim 5, wherein, in the second operating mode, after reception of the associated receiver signal, the evaluation is effected off-line.

* * * * *